United States Patent [19]

Denyer

[11] Patent Number: 4,805,223
[45] Date of Patent: Feb. 14, 1989

[54] SKIN-PATTERN RECOGNITION METHOD AND DEVICE

[75] Inventor: Peter B. Denyer, Edinburgh, United Kingdom

[73] Assignee: The Quantum Fund Limited, Edinburgh, Scotland

[21] Appl. No.: 2,402

[22] PCT Filed: Apr. 21, 1986

[86] PCT No.: PCT/GB86/00219
§ 371 Date: Dec. 18, 1986
§ 102(e) Date: Dec. 18, 1986

[87] PCT Pub. No.: WO86/06527
PCT Pub. Date: Nov. 6, 1986

[30] Foreign Application Priority Data
Apr. 22, 1985 [GB] United Kingdom ............... 8510174

[51] Int. Cl.⁴ .............................................. G06K 9/00
[52] U.S. Cl. ........................................... 382/4; 382/52
[58] Field of Search .................... 382/4, 5, 52; 356/71

[56] References Cited

U.S. PATENT DOCUMENTS

| | | | |
|---|---|---|---|
| 3,200,701 | 8/1965 | White | 382/4 |
| 3,944,978 | 3/1976 | Jensen | 340/146.3 E |
| 3,975,711 | 8/1976 | McMahon | 340/146.3 E |
| 4,015,240 | 3/1977 | Swonger et al. | 340/146.3 E |
| 4,151,512 | 4/1979 | Riganati et al. | 340/146.3 E |
| 4,186,378 | 1/1980 | Moulton | 340/146.3 E |
| 4,210,899 | 7/1980 | Swonger | 340/146.3 E |
| 4,246,568 | 1/1981 | Peterson | 340/146.3 E |
| 4,310,827 | 1/1982 | Asai | 340/146.3 E |
| 4,322,163 | 3/1982 | Schiller | 356/71 |
| 4,414,684 | 11/1983 | Blonder | 382/4 |
| 4,468,809 | 8/1984 | Grabowski et al. | 382/34 |
| 4,581,760 | 4/1986 | Schiller et al. | 382/4 |
| 4,618,988 | 10/1986 | Schiller | 382/5 |
| 4,641,350 | 2/1987 | Bunn | 382/4 |

FOREIGN PATENT DOCUMENTS

| | | |
|---|---|---|
| 31163 | 1/1981 | European Pat. Off. . |
| 43988 | 1/1982 | European Pat. Off. . |
| 90377 | 5/1983 | European Pat. Off. . |
| 0169496 | 1/1986 | European Pat. Off. .............. 382/4 |
| 0151265 | 8/1984 | Japan ..................................... 382/4 |
| 1074858 | 7/1967 | United Kingdom . |
| 1278448 | 6/1972 | United Kingdom . |
| 1509095 | 4/1978 | United Kingdom . |
| 1520483 | 8/1978 | United Kingdom . |
| 1535467 | 10/1978 | United Kingdom . |
| 1548667 | 7/1979 | United Kingdom . |
| 1583386 | 2/1980 | United Kingdom . |
| 1601987 | 11/1981 | United Kingdom . |

OTHER PUBLICATIONS

Deerhake et al., "Fingerprint Verification Method", *IBM Tech. Disclosure Bull.*, vol. 18, No. 3, Aug. 1975, pp. 888–889.
IBM TDB, (vol. 17, No. 12, May 1975).

*Primary Examiner*—Leo H. Boudreau
*Attorney, Agent, or Firm*—Albert L. Free

[57] ABSTRACT

A method of authenticating a person by comparing information from a currently taken skin-pattern with stored information from a previously taken skin-pattern is characterized in that the currently taken skin-pattern is produced on a contact surface, an image of the print of the skin pattern on the contact surface is projected onto a photo-detector device (20), the intensity variations of the print image in at least one region thereof impinging on the photo-detector device is assessed in digital form in a multiplicity of different sub-regions of the or each said region to create (in unit 21) a first digital signal train, a second digital train is derived from the stored skin pattern information (in store 23) and the first and second signal trains are compared (in 24) to determine the degree of coincidence therebetween, an assessment of the determined degree being used to decide (on indicator 27) whether the currently-taken and stored skin patterns are sufficiently similar to authenticate the person.

8 Claims, 5 Drawing Sheets

SKIN-PATTERN RECOGNITION METHOD AND DEVICE

TECHNICAL FIELD

This invention relates to a method for establishing the authenticity of a person presenting oneself to a recognition station. The invention relies on an arrangement for capturing a skin-pattern which is unique to the person in question (e.g. a toe, finger or palm print) and presenting this in digital form so that it can be compared with a memory-stored digitised skin pattern characteristic of the person.

The invention is expected to find applications in a number of different areas. An important one is to verify the identity of a person presenting a credit or bankers card at a point-of-sale location.

Alternatively a skin-pattern authentication method according to the invention can form the basis for an electronic lock, limiting access to a secure location only to individuals authorised to enjoy such access.

A skin-pattern authentication method according to the invention can form the basis for an identity confirmation device to enable secure computer and information access at isolated stations in an electronic or optical network

Discussion of Prior Art

The objective of individual recognition by fingerprints is not unique to this invention. Other approaches have been disclosed in GB-A-1509095, GB-A-1583386, US-A-4015240 and US-A-4310827 and in published literature. Those most frequently cited involve a preliminary analysis of the image to determine the location of minutiae identified with ridge endings, bifurcations, etc.. The pattern of the minutiae is then matched against a reference pattern. The process described in this specification is not related to these forms of recognition; it is not based on any special analysis or property of the minutiae.

The use of a prism to reveal the image of a fingerprint is not unique to this invention (see for example U.S. Pat. No. 4,015,240).

SUMMARY OF THE INVENTION

According to one aspect of the invention, a method of authenticating a person by comparing information from a currently taken skin-pattern with stored information from a previously taken skin-pattern is characterised in that the currently taken skin-pattern is produced on a contact surface, an image of the print of the skin pattern on the contact surface is projected onto a photo-detector device, the intensity variations of the print image in at least one region thereof impinging on the photo-detector device is assessed in digital form in a multiplicity of different sub-regions of the or each said region to create a first digital signal train, a second digital signal train is derived from the stored skin pattern information and the first and second signal trains are compared to determine the degree of coincidence therebetween, an assessment of the determined degree being used to decide whether the currently-taken and stored skin patterns are sufficiently similar to authenticate the person.

The process of direct correlation which is utilised in the carrying out of the method of this invention, is conventionally discarded as impractical on the grounds of image variation and distortion. The method disclosed here overcomes the difficulties associated with direct correlation and offers a unique practical solution for speedy and economical recognition hardware.

Suitably the image of the skin pattern is created by making the contact surface, the hypotenuse face of a right angled prism and projecting an image of this pattern-contacted face onto a surface of the photodetector device which is divided into a multiplicity of separate photon-sensitive areas, each representing one pixel of the projected image.

Preferably the degree of coincidence between the first and second signal trains is assessed on the basis of direct correlation and desirably by direct binary correlation.

Conveniently the direct correlation is effected using, as the stored information, a reference template representing less than 10% of the full image of the currently-taken skin pattern.

Suitably only determinate samples of the image which can clearly be categorised as a binary "1" or a binary "0" are used for the correlation, all "indeterminate" samples being discounted.

Possible misalignment between currently and previously taken skin patterns can be allowed for by the use of multiple trial correlations over a range of stepped lateral movements and a range of discrete angular displacements of a reference template relative to the currently taken skin pattern.

To compensate for possible stretching of the skin during the taking of the skin pattern two or more templates can be used and the direct correlation made while allowing relative translational and/or rotational movements between the two or more templates.

The invention also extends to a finger print capture device comprising a photo-detector device having a surface divided into a matrix of separate photosensitive areas, each of which can monitor the light intensity of one pixel of an image projected thereon and means to project a fingerprint pattern onto said matrix-divided surface. The device is characterised in that the fingerprint pattern is created on the hypotenuse face of a right angle prism, the prism, an illuminating source for the face, an optical system for projecting an image of the hypotenuse face onto the said matrix-divided surface, and the photo-detector device being mounted together as a composite unit.

Conveniently the hypotenuse face of the prism includes means to encourage consistently similar locations of fingers on the hypotenuse face.

The fingerprint capture device defined above can be used to create a first signal train from a real time image of a fingerprint of a presenter of a sheet member (e.g. a cheque or bankers/credit card) required for a cash transaction and can be associated with means to read from the sheet member the second signal train.

In another mode of use, the fingerprint captive device can be used to create a first signal train from a real time image of a fingerprint of a person requiring verification, the capture device being linked to a remote data bank from which the second signal trains of fingerprints of many different persons can be generated and the local capture device being associated with means whereby a nominated person's second signal train can be called up for comparison with an output of the local capture device.

The fingerprint capture device can be associated with the release mechanism of a normally-locked site access device.

BRIEF DESCRIPTION OF THE DRAWINGS

The invention will now be further described, by way of example, with reference to the accompanying drawings, in which.

DESCRIPTION OF PREFERRED EMBODIMENTS

The invention is capable of operating with skin-patterns from a finger, thumb, toe or palm. For convenience, however, the following description will refer exclusively to fingerprints but this should not be taken to represent a limitation of the invention to such prints.

Figure 1:
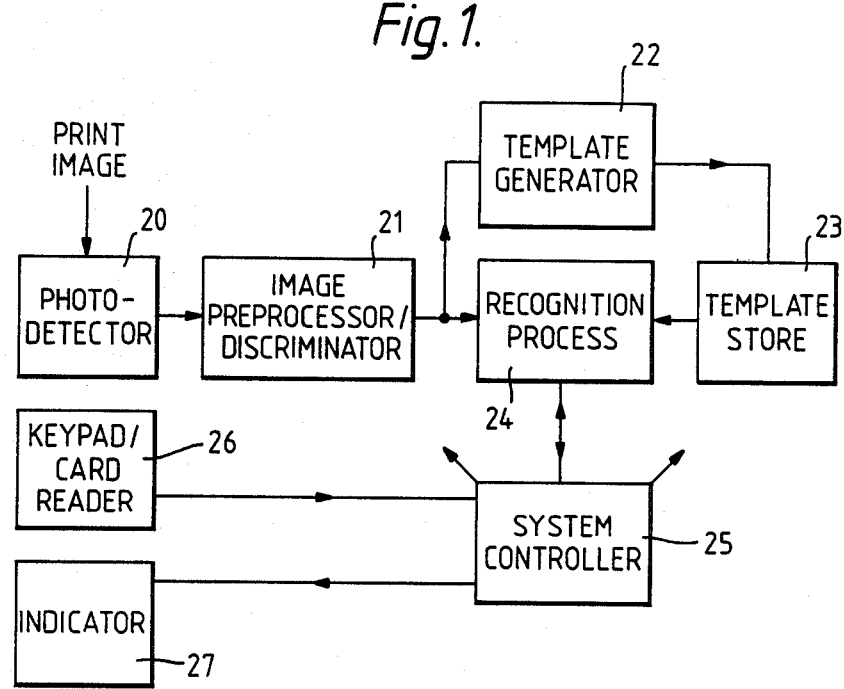
FIG. 1 shows the principle components of a skin-pattern authentication device based on the method of the invention.

Referring to FIG. 1, the basic components of hardware of a preferred arrangement required to operate the method of the invention are shown.

A photo-detector 20 receives a fingerprint image on a photo-sensitive surface thereof and feeds an electrical signal representative of the image to an image preprocessor/discriminator unit 21. The output of the unit 21 can be used as a record of the individual providing the fingerprint (in which case it is processed in a template generator 22 and retained in a store 23) or as a representation of a real time image for comparison with a record in the template store 23. The comparison is effected in a unit 24. Calling-up information from the store 23 and controlling the units 21 and 24 is performed by a system controller 25 actuated (at least as shown in FIG. 1) by a keypad/card reader 26 and supplying an output signal (indicating recognition/or nonrecognition) to an indicator 27.

Figure 2:
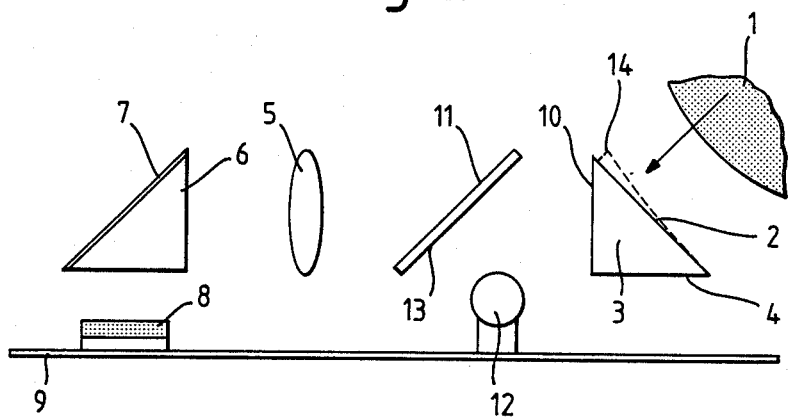
FIG. 2 shows the preferred optical and photodetector assembly for a skin-pattern capture device according to the invention.

A compact optical/electronic system for sensing fingerprint images is shown in FIG. 2. A fingerpad 1, is presented to face 2 of a prism 3. The further face 4 of said prism, or any surface perpendicularly below said further face, is blackened. In the absence of any contact between the fingerpad 1 and the face 2, the image viewed through face 10 of the prism is a dark image of the face 4, internally reflected by the face 2. When the ridges of the fingerpad contact the face 2 however, the process of internal reflection is disturbed and incident light from any direction is scattered at the points of contact. This gives rise to a bright image of the ridge pattern of the fingerpad 1 as viewed through the face 10.

The image of the fingerprint is focussed onto a light-sensitive surface of a photo-detector imaging device 8 through a lens 5. A further prism 6 serves as a reflector to alter the angle of the optical axis so that the optical structure, comprising the lens 5 and prism 6, may lie parallel to a circuit board 9. This facilitates a relatively flat mechanical structure and permits the circuit board to support both the imaging device 8 and the optical structure 3, 5, 6 as one unit.

The reflecting properties of the prism 6 may be enhanced by silvering face 7, or by replacing this prism entirely with a mirror in the plane of the face 7. Also the optical principle of the system may be preserved if a pinhole aperture is used in place of the lens 5.

The source of the incident light may be provided by ambient light through any of the available faces of the prism 3, or by one or more artificial light sources mounted in the vicinity of the prism 3. In FIG. 2 a light source 12 is used and a glass plate (or partly-silvered mirror) 11 has a surface 13 from which the light from the source 12 is fed into the prism 3.

In operation, the viewing angle set by the relationship between the device 8, the prisms 3 and 6 and the lens 5 is preferably below the critical angle causing total internal reflection at the hypotenuse face 2 of the prism 3. In this case the viewed image is normally black, except where ridges of the fingerprint make contact with the surface of the prism, causing scattered light to form a bright image in the viewing direction. A typical such image is shown at 15 in FIG. 3.

Figure 3:
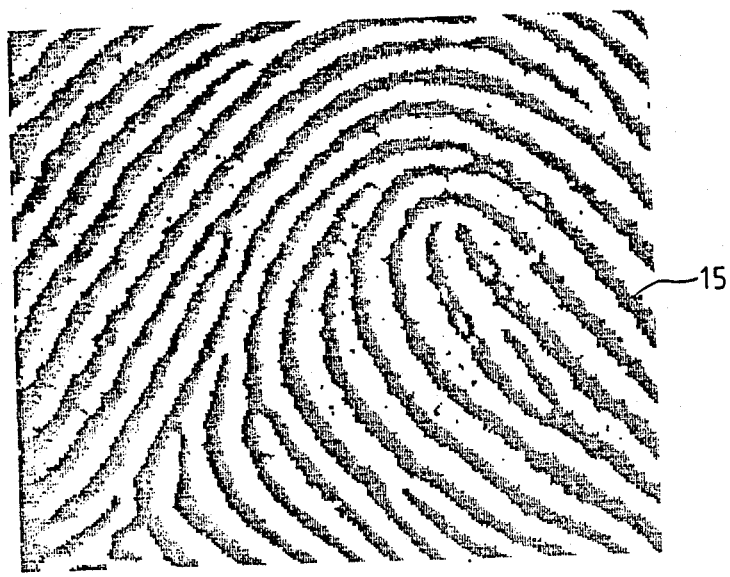
FIG. 3 is an example of a typical fingerprint image captured by the device of FIG. 2, FIGS. 4a show how a reference signal may be formed from a sparsely sampled template, FIG. 4a being an enlarged example of part of a binary print image and FIG. 4b showing how six samples may be selected and coded to form a template of this part of the image.

The light-sensitive surface of the photo-detector device 8 is divided into a multiplicity of photon-sensitive areas, each representing one pixel of the projected image 15 shown in FIG. 3.

The chief attractions of the device shown in FIG. 2 are that it is small and solid-state (there are no moving parts) and that it should be economical to produce in volume. All of the components (both optical and electronic) can be mounted on a single circuit card. It senses the print of any fingertip presented by touching the face 2 of the prism 3. The capture time may be a fraction of a second. The result is a high contrast black/white image stored as a pattern of 1's and 0's in a Random Access Memory or similar device.

When the print image is required in a high-contrast (black/white) form, the photo-detector device 8 should include, or be followed by, a binary discriminator to decide the value of each sample point in the image 15. This requirement may be met by using a Dynamic Random Access Memory (DRAM) device as a combined photo-detector and binary discriminator. Irrespective of end use, the production cost of a recognition system according to the invention may be reduced by using a DRAM imager/discriminator in place of a conventional solid-state photo-detector device.

Preferably an image of the fingerprint is required in a simple binary (black and white) representation. The process of binary discrimination may occur within the photo-detector device itself by applying a threshold of decision uniformly across the received image. Alternatively the discrimination may occur in a separate process whereby an analogue representation of the image is converted to a multiple-level digital form and a threshold of discrimination is derived separately for each sample point, or area of samples, according to the average values of the samples within the local neighbourhood. This process is known as adaptive thresholding and serves to cancel gross variations in the intensity of the print image due to differing surface conditions and contact pressures.

An important aspect of this invention resides in the recognition process. To achieve the aims of fast response time and low hardware cost, it is desirable that this should involve minimal computation. Existing schemes based on minutiae extraction and comparison are markedly expensive in this context. They have developed through earlier work on print matching for Police and Court applications. This degree of analysis may be unwarranted in a consummer application, where the error rate needs to be sufficiently low to deter a fraud attempt, but need not be so low as to offer an absolute guarantee of identity.

The preferred recognition algorithm employed is a form of "binary correlation". In its simplest embodiment this involves comparing a binarised image of the print with a binary reference image, and counting the coincidences (black with black, and white with white). This elementary computational exercise which may be executed at high speed in electronic hardware. However, this simple form has several practical disadvantages. Firstly, where the reference is a whole print image (perhaps 64K bits of information), the storage requirement is undesirably large. Secondly, the print image may not be consistently aligned with the optical path of the sensing mechanism, so that both translational and rotational misalignment is possible. Thirdly, and despite the use of adaptive threshold techniques, the print image may differ marginally from trial to trial according to the lighting conditions, the pressure of contact and the condition of the skin (dry or greasy). Finally, the print may be distorted due to stretching of the skin according to the direction and force of contact.

We disclose here four novel procedures that modify the direct form of binary correlation to overcome each of the problems identified above and ensure a practically successful print recognition mechanism.

To reduce the storage and computational requirements, a reference template is derived which contains relatively few samples chosen in a fixed pattern from the print image, for the purpose of example, suppose that we use a reference template of 100 points, selected from an image of 256×256 pixels. Both the storage and computation times using this template are reduced in the ratio 100:65,536 over the use of the full image. The possible combinations of a 100-bit template are nevertheless sufficient to ensure a small likelihood of significant correlation, except for an identical print.

Misalignment of the print is accommodated by the use of multiple trial correlations over a range of potential positions and orientations. For example, lateral movements up to 64 pixels in any direction in one pixel steps, and rotational movements up to +/−5 degrees in one degree steps, may be examined in a set of approximately 180,000 trials. A success in any one trial may be taken as an indication of a match at a particular position and orientation.

The extent of the misalignment, and thus the number of potential trials required, may be restricted by the use of a raised moulding 14 on the surface of the prism to which the finger is presented. This moulding acts as a guide to maintain the area of contact in an approximately consistent position and orientation.

Figure 4A:
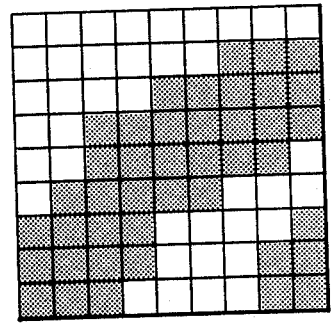
Figure 4B:
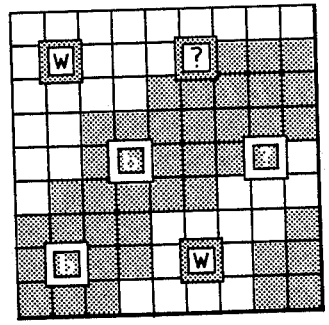

Marginal variations in the images obtained from the same print may still arise. These are accommodated by recoding the reference template to indicate the most likely areas of variation, and then inhibiting these samples from the correlation. The samples most frequently effected are those that lie close to the ridge/trough (white/black) transitions. These may be identified in one approach by marking as "indeterminate" any pixel which contains another pixel of the opposite colour within a chosen radius (for example, a radius of 1 or 2 pixels). Now the reference template contains a set of samples, each marked "black", "white" or "indeterminate" ("b", "w" and "!" in FIG. 4b). During correlation, matches and mismatches are counted from the determinate ("b" and "w") samples only. These samples represent black and white regions at the cores of troughs and ridges, where the same value may consistently be expected. The final correlation score may then be taken as the ratio of this count to the potential number of determinate candidates.

Distortion due to stretching and compression of the skin can spoil direct matching over large print areas. These forms of image distortion are accommodated by using a reference template which covers only an area of the print of less than 10 mm$^2$ (for example 1 or 2 mm square).

Figure 5A:
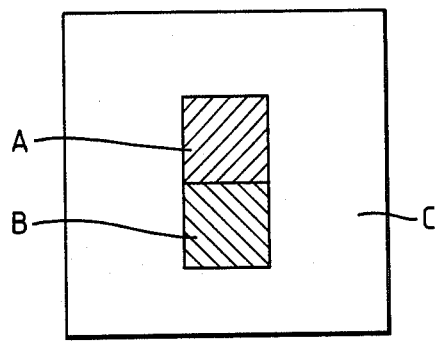
FIGS. 5a-5c show how a set of templates can be used to test for correlation at different places in the image space, FIG. 5a showing an example of two adjacent templates, FIGS. 5b showing one example of a trail placement of the template set of FIG. 5a to test for a match in the upper left of the image space with some anti-clockwise rotation and FIG. 5c showing one example of a possible rearrangement of the templates in the position of FIG. 5b, to accommodate for local image distortion.
Figure 5B:
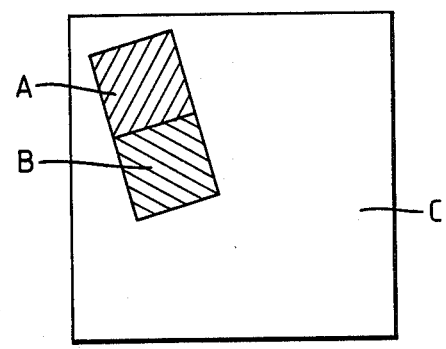
Figure 5C:
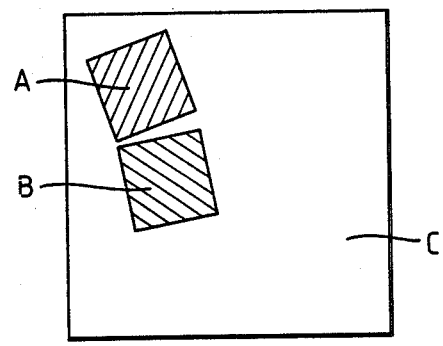

Unfortunately, the use of small template areas with many trials (as described above) may significantly increase the likelihood of a match being detected in part of a non-identical print. This reduces the discriminating power of the recognition system and is an undesirable feature. Higher levels of discrimination may be restored by using multiple templates (as shown at A and B in FIG. 5a) arranged in a predetermined pattern over the image space C. Distortion by stretching may be accommodated in this process by permitting small relative displacements (both translational and rotational) of the individual templates about their expected positions (as is shown in FIG. 5c).

When matching a set of templates to a print image using this process, it is not necessary to compute correlation scores for every possible arrangement of the templates at every possible trial position and orientation. This would be a combinatorially excessive task. Instead, it is sufficient to compute the correlation score for one template in the first instance and to reject a trial position solely on the basis of the failure of this single template. Conversely, a high correlation score for one template may be taken as an indication of a possible match, so that arrangements of a second template may be tested. Third and subsequent templates may be tested conditionally upon the success of the preceding templates in the set, and so on. A match is indicated only by a combination of high scores for the complete set of templates.

To achieve short recognition times and low hardware cost it is desirable to execute the processes of binary correlation described above in one or more specialised large-scale integrated circuits.

Applications

Taking the above detection and matching processes, it is possible to address several applications in the field of personal identification and security.

Figure 6:
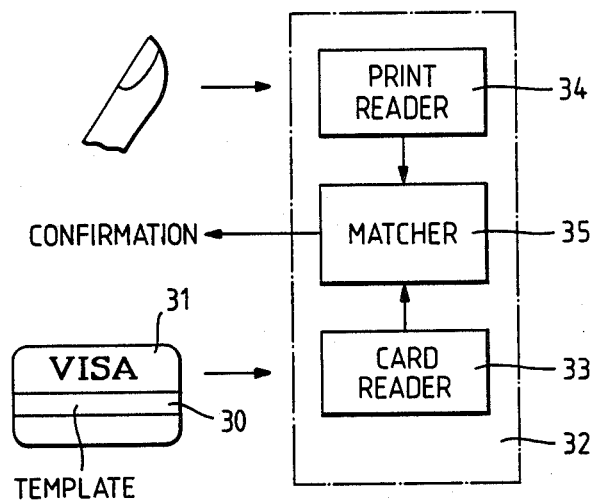
FIGS. 6 to 9 show various ways of putting the method according to the invention into practice.

In one application (see FIG. 6), the derived reference template(s) for an individual may be recorded onto the magnetic strip 30 on the reverse side of a cheque or credit card 31. A self-contained unit 32 at the point of sale may then be used to read this reference from the magnetic strip in a card reader 33, form a realtime image of the fingerprint of the person presenting the card in a print reader 34, and proceed to verify his identity as the true owner of the card in a matcher unit 35.

When the point-of-sale is networked to some central computer 36 (as in electronic funds transfer) other combinations become possible; in particular the reference template may be stored in the remote computer 36, rather than on the card 31. This admits a very secure system which is proof against card (and template) forgery as well as theft. These schemes afford the option of performing the match in the central computer, with the advantage of removing matching hardware from the point-of-sale equipment, thereby reducing its cost.

Figure 7:
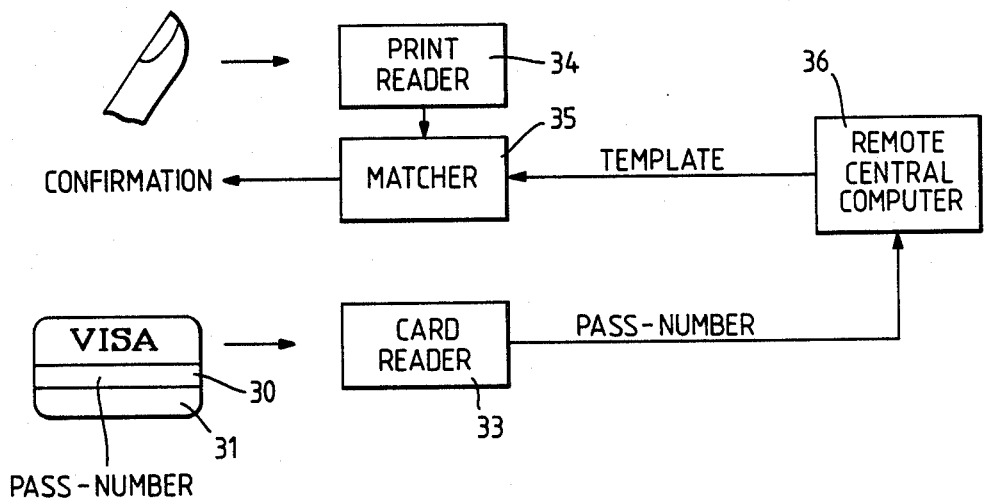

Possible embodiments of this theme include:

(a) Storing the template in the central computer 36 and a pass-number on the magnetic strip 30 of the card 31 (as shown in FIG. 7). On presentation of the card at the point-of-sale, a pass-number is transmitted to the central computer 36. This pass-number is used to bring forth a representative template which is then transmitted to the point-of-sale matcher unit 35 for local confirmation of identity.

Figure 8:
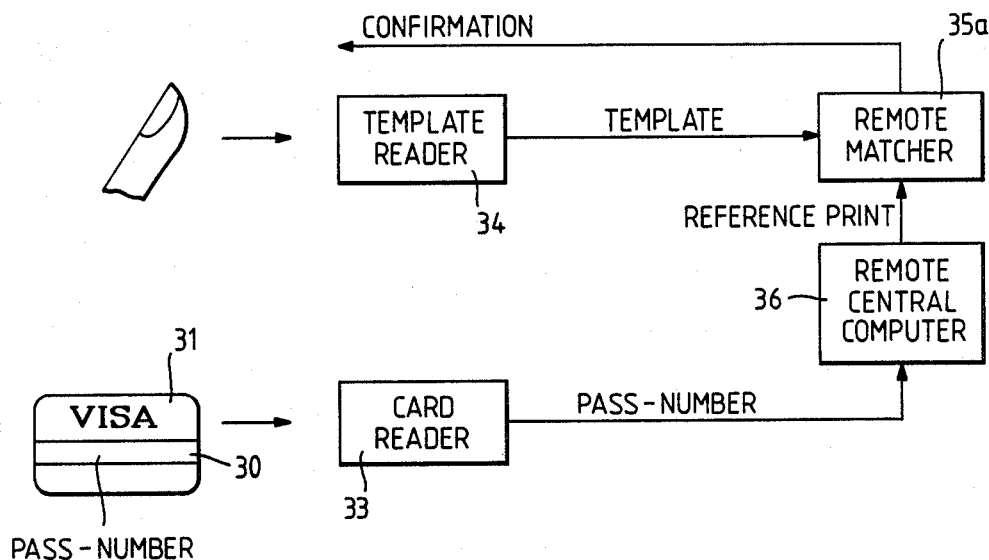

(b) Storing a whole print image in the central computer 36, and a pass-number on the strip 30 on the card 31. The point-of-sale equipment transmits the pass-number and a sparsely sampled image (template) set to the central computer. The computer then matches the received template against a full print reference in a remote matcher 35a and transmits confirmation back to the point-of-sale (see FIG. 8).

Figure 9:
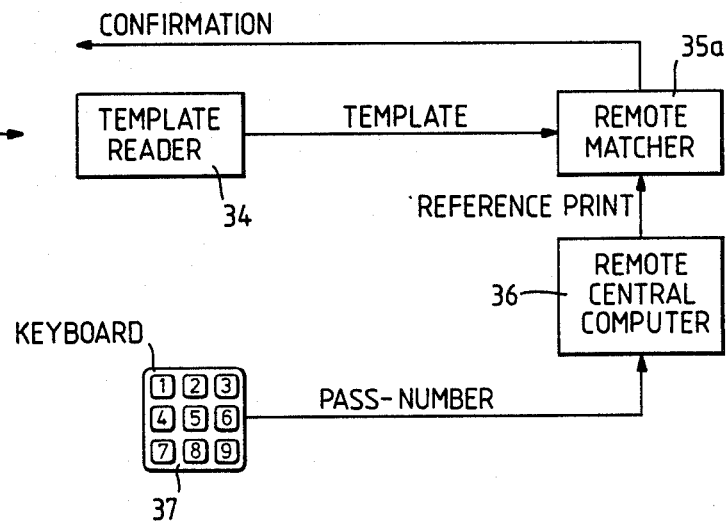

A further variation on the above is to allow the consumer to remember the pass-number, to be keyed in at a keyboard 37 at the point-of-sale. This is shown in FIG. 9 and removes the requirement for the issue and maintenance of a card system, and obviates the requirement for any card reader at the point-of-sale.

The recognition system disclosed here may further be used as the basis of a secure remote computer access system. In this case the identity of a user at a remote terminal may be confirmed by providing print-sensor equipment at the terminal site capable of transmitting an image of the print, or a reduced template form of the image, to the host machine for verification.

The recognition system may further be used as the basis of a secure doorlock or site access device. In this case a library of templates corresponding to the set of people to be permitted entry, may be stored in the lock device, or remotely. The user may present a card containing magnetic or optically encoded identity information, or may enter an identity code at a keypad, which information is used to bring forth reference templates which are used to verify his identity.

I claim:

1. A method of authenticating a person by comparing information from a currently taken skin pattern with stored information from previously taken skin pattern, the currently taken skin-pattern being produced on a contact surface, an image of the print of the skin pattern on the contact surface being projected into a photo-detector device, the intensity variations of the image of the skin pattern in at least one region thereof impinging on the photo-detector device being assessed in digital form in a series of binary "1" units and "0" units to create a first digital signal train by setting a threshold intensity and judging image areas of intensity above the threshold as meriting one type of binary unit and other image areas of intensity below the threshold as meriting the other type of binary unit, a second digital signal train being derived from the stored skin pattern information and the first and second signal trains being compared to determine the degree of coincidence therebetween, an assessment of the determined degree being used to decide whether the currently taken and stored skin patterns are sufficiently similar to authenticate the person, the degree of coincidence between the first and second signal trains being assessed by looking for correlation between digital signal trains representative of respective first sub-regions of each of the currently taken and stored skin patterns and between respective second sub-regions of each of the currently taken and stored skin patterns while allowing relative translational and rotational movements between the first and second sub-regions of one of the skin patterns, the threshold used for the first digital signal train being adapted according to an average value of intensity within a sampling region of the skin pattern image used to create the first digital signal train, and the second signal train being derived by considering only determinate samples of the previously taken skin pattern image which can clearly be categorized as a binary "1" or a binary "0" so that in the correlation between the first and second signal trains, all "indeterminate" samples in the second signal train are discounted.

2. A method as claimed in claim 1, characterized in that a correlation score is first computed using just first sub-regions of each skin pattern and the second sub-regions are used only if a predetermined correlation score is exceeded with the first sub-regions and in that authentication is determined only if a predetermined correlation score is exceeded with both first and second sub-regions.

3. A method as claimed in claim 14, characterized in that third and subsequent sub-regions of each skin pattern are used if a predetermined correlation score is exceeded with the first and second sub-regions and authentication is determined only if a predetermined correlation score is exceeded with all sub-regions used.

4. In the operation of the method of claim 1, the use of a fingerprint capture device comprising a photo-detector device having a surface divided into a matrix of separate photosensitive areas, each of which can monitor the light intensity of one pixel of an image projected thereon and an optical system including a lens having an optical axis to project a fingerprint pattern onto said matrix-divided surface, the fingerprint pattern being created on the hypotenuse face of a right angle prism, characterized in that the prism, an illuminating source for the hypotenuse face, the optical system for projecting an image of the hypotenuse face onto said matrix-divided surface, and the photo-detector device are mounted together on a circuit board with the optical axis of the lens extending parallel to a surface of the board to define a compact composite unit.

5. A device as claimed in claim 4, characterized in that the hypotenuse face of the prism includes means to encourage consistently similar locations of fingers on the hypotenuse face.

6. A device as claimed in claim 4, character in that the device is used to create a first signal train from a real time image of a fingerprint of a presenter of a sheet member required for a cash transaction and is associated with means to read from the sheet member the second signal train.

7. A device as claimed in claim 1, characterized in that a local capture device is used to create a first signal train from a real time image of a fingerprint of a person requiring verification, the local capture device being inked to a remote data bank from which the second signal rains of a fingerprints of many different persons can be generated and the local capture device being associated with means whereby a nominated person's second signal train can be called up for comparison with an output of the local capture device.

8. A device as claimed in claim 4, characterized in that it is associated with the release mechanism of a normally locked site access device.

* * * * *